United States Patent Office 3,078,315
Patented Feb. 19, 1963

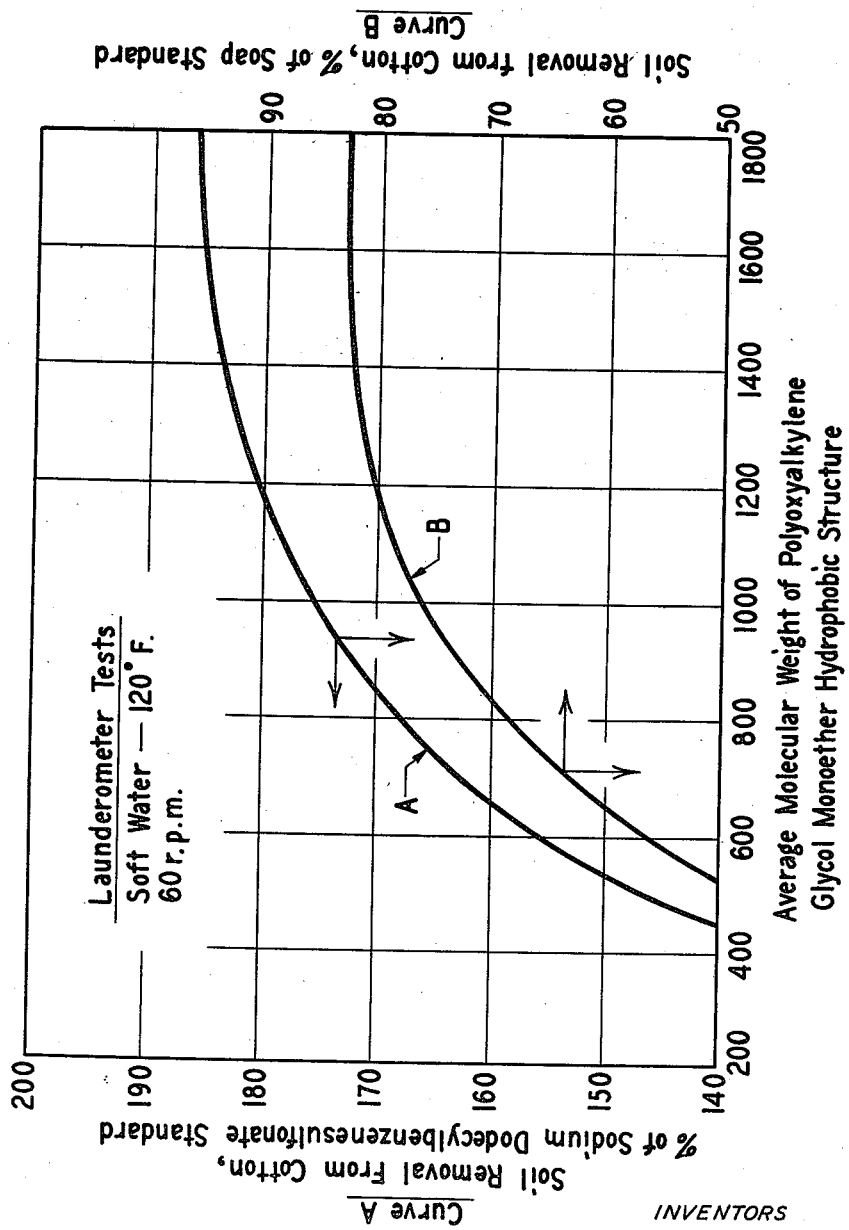

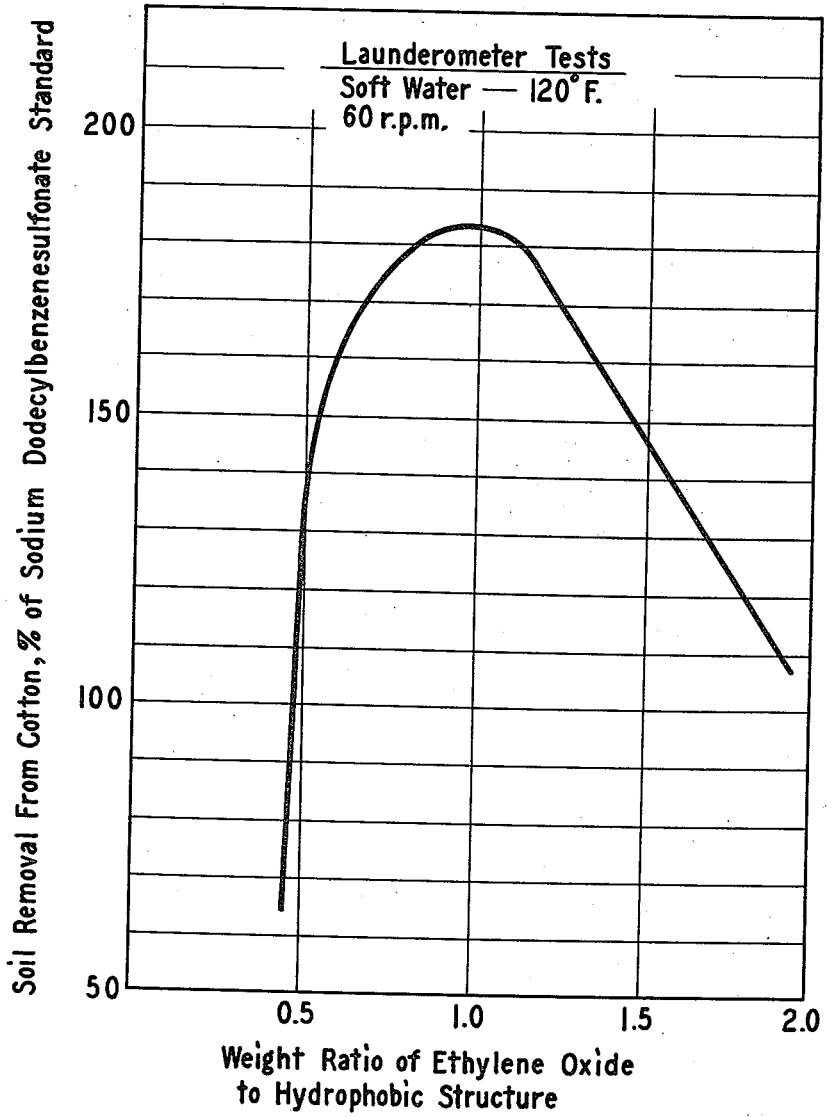

3,078,315
POLYOXYALKYLENE PRODUCTS
Arthur B. Steele, Jr., Ossining, N.Y., and Edward J. Mills, Jr., Charleston, and Donald G. Leis, St. Albans, W. Va., assignors to Union Carbide Corporation, a corporation of New York
Filed Sept. 2, 1955, Ser. No. 532,283
12 Claims. (Cl. 260—615)

This invention relates to new alkylene oxide products having surface-active properties and useful as detergents either alone or fortified with builders, as emulsifying agents for aromatic hydrocarbons in water, and as dispersing agents, and methods for preparing them. More specifically, the invention relates to polyoxyalkylene glycol ethers prepared by the addition of controlled quantities of ethylene oxide to a hydrophobe of minimum molecular weight made by the heteric addition of a mixture of 1,2-propylene oxide and ethylene oxide to an aliphatic monohydroxy alcohol.

The advantages of the products as detergents over known surfactant materials are better understood from a consideration of the relationship of detergent properties to the structure of the products. We have found that the performance of the products of the invention as detergents is determined by several factors. One factor is the average molecular weight of the hydrophobe, a polyoxyalkylene glycol either consisting of a monohydric alcohol to which is attached a heteric mixture of ethylene oxide and 1,2-propylene oxide. Another factor is the number of ethylene oxide molecules, the hydrophile, added to the hydrophobe structure, which may be expressed as the weight ratio of hydrophile to hydrophobe, and which is course affects the average total molecular weight of the products.

The efficiency of the products of the invention as detergents with respect to the factors just mentioned was determined by a series of tests of various compounds. These tests were developed after prolonged experiment and serve as a basis for accurate comparison with standards of detergency. The procedures are based on those recommended by O. C. Bacon in "A Practical Laboratory Test for Evaluating Scouring Agents for Cotton," American Dyestuff Reporter, volume 34, No. 26, page 525. The tests were made as follows. The cotton sheeting selected for preparing the soiled material had a warp and filling count of 60 by 60 threads per inch. The fabric was desized with diastase and subjected to soft-water scouring to provide a whiteness of approximately 85 percent of that of magnesium oxide.

A soiling composition was prepared by mixing 120 grams of wheat starch (200 mesh), 60 grams of Germantown grade carbon lamp black, and 180 grams of "Crisco" vegetable shortening at a temperature of 100° F. until a uniform paste was obtained. With continual stirring of the paste at 100° F., there was added 258 grams of "Nujol" white mineral oil. Soiling solutions consisting of 10.3 grams of soiling composition and 1000 ml. of carbon tetrachloride were made up. The test fabric, cut into strips six inches wide, was coated with the soiling solution and then passed through squeeze rolls to thoroughly impregnate the fabric. The impregnated fabric was dried in air and then heated for 30 minutes at a temperature of 160° F., after which it was stored in a calcium chloride desiccator until used.

For the laundering operation an Atlas Launderometer, a commercial testing machine, operating at a speed of 60 revolutions per minute and at a temperature of 120° F. was employed. To establish a standard, 2 pieces of the soiled fabric, each three inches square, together with 20 quarter-inch stainless steel balls were placed in a pint Mason jar containing 200 ml. of distilled water. The closed jar was preheated to a temperature of 120° F. in ten minutes and then placed in the Launderometer which was operated at a temperature of 120° F. for twenty minutes at a rotor speed of sixty revolutions per minute. The rinsed samples were removed from the jar without squeezing. They were then air dried and the brightness of the soiled fabric was determined to serve as a standard of zero detergent concentration from which to measure the effectiveness of the detergents. Unsoiled fabric samples were similarly rinsed, dried and tested for brightness to serve as the standard of perfect soil removal. The soiled samples were used to test the various detergent solutions by the use of a similar procedure. They only difference was to put 200 ml. of detergent solution, rather than of distilled water, into the Mason jars. After the scouring cycle in the Launderometer, these samples were rinsed twice by dipping in distilled water and then air-dried.

The procedure for measuring the brightness of all samples, unsoiled, soiled, and scoured, was as follows. After the air drying, the samples were ironed and a "Photovolt" reflectometer, calibrated, to read relative to magnesium oxide, was used to measure the percentage brightness of the various samples. In order to determine the percentage of soil removed during the scouring operation, the Kubelka and Munk equation was employed:

$$K/S = \frac{(1-R)^2}{2R}$$

where:

$K$ = coefficient of reflectivity
$S$ = coefficient of light scattering
$R$ = observed reflectivity for monochromatic light then:

$$\frac{K/S \text{ for soiled fabric} - K/S \text{ for scoured fabric}}{K/S \text{ for soiled fabric} - K/S \text{ for unsoiled fabric}} \times 100$$

$$= \text{percent soil removed}$$

The accuracy of this test has been proved by inventorying soil in the wash after scouring and comparing this quantity with the quantity of soil remaining the soiled sample after scouring, as determined by chemical analysis.

In determining the relative efficiency as detergents of the products of the examples, it is of value to compare by dividing the percentage of soil removed by the experimental detergent by the percentage of soil removed by the standard detergent, as determined in the above manner, multiplying the result by 100. In all wash tests the reference detergent was arbitrarily assigned a rating of 100. As a standard soap we used "Ivory Flakes" soap flakes and as a standard detergent we employed sodium dodecylbenzenesulfonate.

In making the products of the invention, the starting material is an aliphatic monohydroxy alcohol. Such alcohols include n-butanol, 2-ethylhexanol, methanol, ethanol, n-propanol, isobutanol, 2-ethylbutanol, n-hepanol and isopropanol, among others. To this is added a heteric mixture of ethylene oxide and 1,2-propylene oxide whereby a hydrophobe consisting of an alkyl monoether of a heteric oxyethylene-oxypropylene diol is formed. The proportion of ethylene oxide in the oxide mixture should be between 5 and 15 percent by weight with about 10 percent being preferred. Above 15 percent, the resulting polyoxyalkylene monoalkyl ether does not make a satisfactory hydrophobe. We have found that maximum scouring efficiency is obtained with a hydrophobe having an average molecular weight of at least 1200. This has been discovered by experiments wherein products were made up having the same weight ratio of ethylene oxide added to the hydrophobe, but varying in the molecular weight of the hydrophobe. These products were tested as detergents in the manner described above and the efficiencies thus determined were plotted on a graph as a function of the molecular weight of the hydrophobe. The results are shown in FIG. 1 of the drawing.

FIG. 1 of the drawing is a graph showing the effect on the scouring power of products of the invention of increasing the average molecular weight of the hydrophobe while keeping the weight ratio of hydrophile to hydrophobe constant. Curve B of FIG. 1 illustrates scouring power compared to a soap standard, and curve A of FIG. 1 illustrates it compared to a synthetic detergent standard, specifically sodium dodecylbenzenesulfonate. We have found that detergency increases gradually as the molecular weight of the polyoxyalkylene hydrophobe is increased, with no sudden change in scouring efficiency at any specific point. While there is no sharply defined point on the curve by which to set a minimum, we consider an average molecular weight of about 1000 to be a minimum for the hydrophobe, with an average molecular weight of 1200 to 1500 or above preferred. Efficiency as a detergent increases gradually between hydrophobe molecular weights of 1000 and 2000. Increasing the average molecular weight of the hydrophobe above 2000 seems to produce little or no improvement in the detergent scouring power of the compounds.

Another factor we have found to affect the scouring power of the products of our invention is the weight ratio of ethylene oxide adduct hydrophile to polyoxyalkylene glycol ether hydrophobe. FIG. 2 of the drawing is a graph showing the effect on the scouring power of products of the invention of varying the weight ratio of ethylene oxide to hydrophobe, while maintaining the hydrophobe average molecular weight constant, using a synthetic detergent standard, namely, sodium dodecylbenzenesulfonate. From these graphs it can be seen that maximum scouring power is achieved when the weight ratio of ethylene oxide adduct to hydrophobe is about 1 to 1. From our experiments we conclude that the workable range for this ratio is from 0.8 to 1.2 parts by weight of ethylene oxide to 1 part polyoxyalkylene glycol ether hydrophobe.

The hydrophobe-hydrophile balance of non-ionic compounds can be measured by the so-called cloud point of the products when used as detergents. The cloud point may be defined as the temperature at which the detergent composition in aqueous solution begins to form a separate phase. The cloud point is not an independent variable but depends upon and varies with both the molecular weight of the hydrophobe and the weight ratio of hydrophile to hydrophobe. For maximum efficiency it should be kept just above the temperature at which the detergent is to be used. Thus, in products to be used as detergent compositions intended for household use, where a water temperature of about 60° C. is assumed, the products should have a cloud point just above 60° C. A product intended as a detergent for commercial hot water laundry use, however, should have a cloud point a little above 80° C. Cloud point may be adjusted readily within the limits of the invention, particularly by varying the hydrophile to hydrophobe weight ratio. In fact the cloud point serves as a guide as to when the desired hydrophile-hydrophobe balance has been achieved.

In addition to their detergent properties, the products of the invention are also excellent emulsifying agents for aromatic hydrocarbons in aqueous solutions. The products are produced in the same manner and with the same limits of molecular weight, hydrophobe-hydrophile balance, etc., as when they are made up for use in detergents.

The efficacy of the products of the invention as emulsifiers can be readily seen from a comparison of their performance with that of commercial emulsifiers in typical emulsifiable concentrate formulations consisting of commercial insecticides dissolved in aromatic solvents. For this purpose such solutions were made up both with products of the invention using the final products of some of the examples given below, and with typical commercial emulsifiers.

Two types of solutions were made up, herein designated X and Y. The X solutions consisted of 25 percent by weight of 1,1,1-trichloro-2,2-bis(para-chlorophenyl) ethane, commonly known as DDT, 70 percent by weight of "Velsicol Ar-50," an aromatic solvent rich in methylated naphthalenes, and 5 percent by weight of emulsifier. The Y solutions consisted of 45 percent by weight of "Toxaphene," a technical grade of chlorinated camphene, 50 percent by weight of "Velsicol Ar-50" and 5 percent by weight of emulsifier.

The solutions were brought to a temperature of 60° F. and 100 gram quantities of solution were poured into 400 gram quantities of distilled water at a temperature of 60° F. in a separatory funnel. An emulsion was formed by turning the funnel end-over-end fifteen times in fifteen seconds (i.e. fifteen half turns). The emulsion was then added to a jacketed tube, avoiding foam. A hydrostatic balance of the type proposed by A. F. Foriati et al., "Assembly and Calibration of a Density Balance for Liquid Hydrocarbons," Journal of Research, National Bureau of Standards, 35, 513 (1945), was used to measure density change, with readings being taken at one minute intervals during the tests. A plot of density against time was made and a half-separation time, the time for the density of the emulsion to drop half way to unity, was calculated. The longer the half-separation time of an emulsion, the more stable the emulsion and hence the more efficient the emulsifier.

The test results, in terms of half-separation time, are given in the tables below. Table I shows the formulations with products of the invention as emulsifiers and Table II shows the formulations with typical commercial emulsifiers, the composition of the commercial emulsifiers being given below the table.

TABLE I

*Products of Invention as Emulsifiers*

| Solution No. | Solution Type | Emulsifier | Half-separation time, minutes |
|---|---|---|---|
| 1 | X | Example I | 180 |
| 2 | X | Example II | 240 |
| 3 | X | Example III | 250 |
| 4 | X | Example IV | 1,400 |
| 5 | Y | Example I | 150 |
| 6 | Y | Example III | 48 |

TABLE II

*Commercial Emulsifiers*

| Solution No. | Solution Type | Emulsifier | Half-separation time, minutes |
|---|---|---|---|
| 7 | X | Commercial A | 27 |
| 8 | X | Commercial B | 30 |
| 9 | X | Commercial C | 20 |
| 10 | X | Commercial D | 25 |
| 11 | Y | Commercial A | 14 |
| 12 | Y | Commercial B | 15 |
| 13 | Y | Commercial C | 8 |
| 14 | Y | Commercial D | 8 |

Commercial Emulsifier A: A nonylphenoxypolyethylene glycol with an average molecular weight of 625.
Commercial Emulsifier B: A blend of various nonionic agents derived from octylphenol and ethylene oxide.
Commercial Emulsifier C: An octylphenoxypolyethylene glycol with an average molecular weight of 505.
Commercial Emulsifier D: A blend of a nonionic agent derived from octylphenol and ethylene oxide and an anionic agent of the alkylarylsulfonate type.

From the above tables it is readily apparent that the products of the invention are superior emulsifying agents as well as excellent detergents.

The products of the invention can be made in a two-step process. In the first step a suitable ethylene oxide-1,2-propylene oxide mixture is added to the monohydroxy alcohol starting material to form the polyoxyalkylene glycol ether hydrophobe. In the second step after a suitable hydrophobe has been formed, the mixed ethylene oxide-propylene oxide feed is discontinued and only ethylene oxide is introduced into the reactor to add the hydrophile structure.

For the first step addition, we have found that good results may be obtained by bringing the ethylene oxide-1,2-propylene oxide mixture into intimate contact with the monohydroxy alcohol starting material in a liquid phase throughout which a catalyst is uniformly distributed. For best results it is essential that the oxide addition reactions be carried out under conditions which are closely controlled with respect to such factors as the amount of catalyst employed and the uniformity of its dispersion, the amount of unreacted alkylene oxides present at any stage during the reactions, the temperature maintained throughout the course of the reactions, and the intimacy and uniformity of contact of the reacting oxides with the reactants to which they are to be added. For best results it is also essential that water be excluded.

As catalyst, sodium hydroxide or potassium hydroxide is preferred in an amount which is about 0.1 to 1.0 percent by weight of the total amount of reactants, including the ethylene oxide and 1,2-propylene oxide appearing in the reaction product. The strongly alkali metal hydroxides can be used in the form of the corresponding alcoholates, if desired. In general, the stronger the alkalinity of the catalyst, the less of it required. All of the catalyst need not be added at the start of the reaction, but instead part may be added at the start and the remainder added during the course of the reactions to maintain a substantially constant catalyst concentration.

The reactions should be carried out at a temperature which is sufficiently high to favor rapid reaction of the alkylene oxides. A rapid reaction rate reduces the time of exposure of the oxide to the catalyst and of contact with the surfaces of the reaction vessel, and thus lessens the possibility of isomerizations and the formation of side-reaction products, particularly those side-reaction products which may be colored. Temperatures from about 80° C. to about 160° C. are operable, with a temperature range of about 100° C. to 130° C. being preferred.

The ethylene oxide-1,2-propylene oxide mixture, and later the ethylene oxide alone, should be supplied to the reaction zone at such a rate as to maintain a controlled concentration of unreacted oxides which is substantially uniform or constant up to the end of the addition reactions. To this end it is desirable to conduct the reaction in a closed system and to introduce the oxides at a rate which will maintain a substantially uniform pressure. Preferably, the pressure should be maintained at about 5 to 50 pounds per square inch, although under favorable conditions, pressures as high as 200 p.s.i. may be used. A non-reactive gas, for instance, nitrogen may be used to assist in maintaining the pressure. It is preferred to cycle the liquid in the reaction vessel, or to agitate it vigorously, in order to wash the walls of the reaction vessel as well as to assist in maintaining intimate contact, uniform temperature and a uniform concentration of the reactants.

For best control in making the products of the invention, it is desirable to carry out the oxide additions under the relatively moisture-free conditions, and to thus avoid side reactions which form glycols. Also, the presence of oxygen tends to favor the formation of side reaction products. Therefore, it is desirable to dry the reaction vessels and connections, and to exhaust oxygen therefrom. This can readily be accomplished by sweeping with dry, oxygen-free gas, such as nitrogen before inducing the charge. The catalyst should also be dry, or substantially so. It has been found that to produce hydrophobes of superior stability and having a molecular weight above 1200, it is desirable, and even essential for good results, that the moisture content of the oxides does not exceed about 0.1 percent by weight. It is recognized, however, that there may be a minmum amount or trace of moisture which is essential, and below which it is undesirable to go.

In the process of the invention, the hydrophobe is made, following the procedures outlined above. The hydrophobe product is then sampled, without removing it from the reaction vessel, to determine the average molecular weight of the product. If the average molecular weight is high enough, ethylene oxide is then fed into the reaction vessel under the same operating conditions as before, and the addition of ethylene oxide is continued until the desired chain length of ethylene oxide hydrophile has been added to form the final detergent product.

The product is then removed from the reaction vessel. If a strong alkaline catalyst has been used, it is preferred to neutralize it with an acid which forms a salt which can be readily removed. Sulfuric acid and carbon dioxide are suitable for this purpose. Other impurities in the product may be removed by suitable conventional techniques such as extraction with organic solvents. Undesirable low-boiling constituents may be stripped off by heating.

The invention may be further illustrated by the following examples. Average molecular weights in the examples were determined by reaction with a phthalic anhydride-pyridine reagent.

EXAMPLE I

Four hundred and eighty grams of butanol in which 30 grams of sodium had been dissolved as catalyst were charged to a suitably equipped reaction vessel with a nominal capacity of ten gallons. After pressurizing several times with nitrogen to remove air and moisture, the autoclave reaction vessel was evacuated to a pressure of approximately 100 mm. of mercury and was then sealed. The butanol and catalyst charge was heated to a temperature of 110 to 115° C., and a mixture of 893 grams of ethylene oxide and 16,967 grams of 1,2-propylene oxide, previously mixed in a feed tank, was fed to the reactor which was maintained at a pressure of 40 to 50 pounds per square inch gauge. At the end of the feed period, the contents of the reactor were maintained at the reaction temperature until the pressure had dropped to 0 pound per square inch gauge.

The hydrophobe which had thus been formed was sampled at this point and found to have an average molecular weight of 1462. At a temperature of 115° C. and a maximum pressure of 40 to 50 pounds per square inch gauge, 17,606 grams of ethylene oxide was added. The crude product was removed from the reactor and refined. This product contained 0.96 part of polyoxyethylene chain per part of hydrophobe chain, and after refining, had a cloud point of 60° C. Tested for soil removal efficiency, the product had 80.5 percent efficiency compared to the soap standard and 182 percent efficiency compared to the dodecylbenzenesulfonate standard.

EXAMPLE II

Four hundred and eighty grams of butanol in which 30 grams of sodium had been dissolved as cataylst was charged to a suitably equipped reaction vessel with a nominal capacity of ten gallons. After pressurizing several times with nitrogen to remove air and moisture, the autoclave reaction vessel was evacuated to a pressure of approximately 100 mm. of mercury and was then sealed. The butanol and catalyst charge was heated to a temperature of 100 to 110° C., and a mixture of 1,263 grams of ethylene oxide and 23,897 grams of 1,2-propylene oxide, previously mixed in a feed tank, was fed to the reactor which was maintained at a maximum pressure of 40 to 50 pounds per square inch gauge. At the end of the feed period, the contents of the reactor were maintained at the reaction temperature until the pressure had dropped to 0 pound per square inch gauge. Fifteen thousand grams of the crude product was removed from the reactor and to the remaining 10,730 grams of polyglycol monoether product there was added an additional 5,340 grams of mixture of 267 grams of ethylene oxide and 5,073 grams of 1,2-propylene oxide under conditions of reaction equivalent to those employed for the initial addition reaction.

The hydrophobe which had thus been formed was sampled at this point and found to have an average molecular weight of 1773. The reactor, after removal and sampling of a portion of the hydrophobe, contained 15,000 grams of unrefined hydrophobe. At a temperature of 100° C. and a maximum pressure of 40 to 50 pounds per square inch gauge, 11,400 grams of ethylene oxide was added.

Approximately 26,400 grams of the product was removed from the reactor and refined. This product contained 0.76 part of polyoxyethylene chain per part of hydrophobe chain, and after refining, had a cloud point of about 50° C. Tested for soil removal efficiency, the product had 80.0 percent efficiency compared to the soap standard and 180 percent efficiency compared to the dodecylbenzenesulfonate standard.

EXAMPLE III

Two hundred and twenty-two grams of n-butanol in which 5 grams of sodium had been dissolved as catalyst was charged to a suitably equipped reaction vessel with a nominal capacity of three gallons. After pressuring several times with nitrogen to remove air and moisture, the autoclave reaction vessel was evacuated to a pressure of approximately 100 mm. of mercury and was then sealed. The butanol and catalyst charge was heated to a temperature of 110 to 115° C., and a mixture of 350 grams of ethylene oxide and 4,770 grams of 1,2-propylene oxide, previously mixed in a feed tank, was fed to the reactor which was maintained at a maximum pressure of 40 to 50 pounds per square inch gauge. At the end of the feed period, the contents of the reactor were maintained at the reaction temperature until the pressure had dropped to 0 pound per square inch gauge.

The hydrophobe which had thus been formed was sampled at this point and found to have an average molecular weight of 1635. The reactor, after removal and sampling of a portion of the hydrophobe, contained 5,240 grams of unrefined hydrophobe. At a temperature of 100° C. and a maximum pressure of 40 to 50 pounds per square inch gauge, 5,700 grams of ethylene oxide was added. Ten thousand grams of the product was removed from the reactor and refined. This product contained 1.1 parts of polyoxyethylene chain per part of hydrophobe chain, and after refining, had a cloud point of 49–51° C. Tested for soil removal efficiency, the product had 81 percent efficiency compared to the soap standard and 180 percent efficiency compared to the dodecylbenzenesulfonate standard.

EXAMPLE IV

Two hundred and thirty-five grams of butanol in which 12 grams of potassium hydroxide had been suspended was charged to a suitably equipped reaction vessel with a nominal capacity of two gallons. After pressurizing several times with nitrogen to remove air and moisture, the autoclave reaction vessel was evacuated to a pressure of approximately 100 mm. of mercury and was then sealed. The butanol and catalyst charge was heated to a temperature of 100 to 110° C., and a mixture of 748 grams of ethylene oxide and 6,632 grams of 1,2-propylene oxide, previously mixed in a feed tank, was fed to the reactor which was maintained at a pressure of 40 to 50 pounds per square inch gauge. At the end of the feed period, the contents of the reactor were maintained at the reaction temperature until the pressure had dropped to 0 pound per square inch gauge.

The hydrophobe which had thus been formed was sampled at this point and found to have an average molecular weight of 1430. The reactor, after sampling and removal of 3,769 grams of hydrophobe, contained 3,769 grams of unrefined hydrophobe. At a temperature of 100° C. and a pressure of 40 to 50 pounds per square inch gauge, 3,610 grams of ethylene oxide was added. The product was removed from the reactor and refined. This product contained 0.84 part of polyoxyethylene chain per part of hydrophobe chain, and after refining, had a cloud point of 60° C. Tested for soil removal efficiency, the product had 80.5 percent efficiency compared to the soap standard and 182 percent efficiency compared to the dodecylbenzenesulfonate standard.

EXAMPLE V

Two hundred and eighty-two grams of 2-ethylhexanol in which 5 grams of sodium had been dissolved as catalyst was charged to a suitably equipped reaction vessel with a nominal capacity of two gallons. After pressurizing several times with nitrogen to remove air and moisture, the autoclave reaction vessel was evacuated to a pressure of approximately 100 mm. of mercury and was then sealed. The 2-ethylhexanol and catalyst charge was heated to a temperature of 100 to 110° C., and a mixture of 329 grams of ethylene oxide and 2,961 grams of 1,2-propylene oxide, previously mixed in a feed tank, was fed to the reactor which was maintained at a pressure of 40 to 50 pounds per square inch gauge. At the end of the feed period, the contents of the reactor were maintained at the reaction temperature until the pressure had dropped to 0 pound per square inch gauge.

The hydrophobe which had thus been formed was sampled at this point and found to have an average molecular weight of 1102. The reactor, after sampling and removal of a portion of the hydrophobe, contained 3,460 grams of unrefined hydrophobe. At a temperature of 100° C. and a pressure of 40 to 50 pounds per square inch gauge, 1,730 grams of ethylene oxide was added. Two thousand grams of the material thus produced were removed, refined, and found to contain only 0.50 part of polyoxyethylene chain per part of hydrophobe chain. There remained in the reactor 3,190 grams of this intermediate product to which were added 1,068 more grams of ethylene oxide at a temperature of 100° C. and at a pressure of 40 to 50 pounds per square inch gauge.

Two thousand grams of the product was removed from the reactor and refined. This product contained one part of polyoxyethylene chain per part of hydrophobe chain, and after refining, had a cloud point of 55° C. Tested for soil removal efficiency the product had 76 percent efficiency compared to the soap standard and 168 percent efficiency compared to the dodecylbenzenesulfonate standard.

The foregoing examples illustrate the detergents of the invention. The importance of the limitations as to the molecular weight of the hydrophobe and the weight ratio of hydrophile to hydrophobe can be seen from a consideration of experiments run outside the scope of the invention. An experiment was run in similar manner to the examples but the hydrophobe made had a molecular weight of only 533, well below the minimum of the invention of about 1000. To this was added ethylene oxide until the hydrophile to hydrophobe ratio was one to one, a ratio within the limits of the invention. Because of the low molecular weight of the hydrophobe, however, the product thus produced had a scouring efficiency of only 46 percent compared to the soap standard and only 101 percent compared to the dodecylbenzenesulfonate standard, both efficiencies being well below those achieved with the products of the invention.

The necessity of maintaining the hydrophile to hydrophobe weight ratio between the limits of 0.8 to 1 and 1.2 to 1 can be seen from the results of an experiment with the hydrophobe of Example V above. The average molecular weight of the hydrophobe of this example was 1102, well above the minimum of 1000 for the products of the invention. When ethylene oxide was added as hydrophile to this hydrophobe in a one to one ratio, a product having satisfactory detergent properties was obtained, as can be seen in the example. Distinctly inferior detergent products resulted however, when the ethylene oxide was added in quantities outside the hydrophile to hydrophobe ratio limits of the invention, i.e. not between 0.8 to 1 and 1.2 to 1 by weight. Thus when the hydrophile to hydrophobe weight ratio was 0.5 to 1 the product had a cloud of 33° C. and a detergency only 34.7 percent of the soap standard and only 76 percent of the sulfonate standard. And when the hydrophile to hydrophobe weight ratio was 1.5 to 1 the product had a cloud point of over 90° C. and a detergency only 69 percent of the soap standard and only 152 percent of the detergent standard.

It can be seen from the above experiments, and from the examples, that in order to make products suitable as detergents, that is, products according to the invention, both the average molecular weight of the hydrophobe and the weight ratio of ethylene oxide as hydrophile to polyoxyalkylene glycol ether hydrophobe must be within the limits of the invention.

What is claimed is:

1. A polyoxyalkylene glycol ether consisting of a hydrophobe consisting of the hydrocarbon moiety of an aliphatic monohydric alcohol containing from 1 to 8 carbon atoms, said hydrocarbon moiety having attached thereto through an etheric oxygen linkage a heteric mixed chain of oxyethylene and 1,2-oxypropylene groups, the weight ratio of oxyethylene groups to 1,2-oxypropylene groups being from 5:95 to 15:85 and the average molecular weight of said hydrophobe being at least 1000, and attached to said mixed chain a hydrophile consisting of a chain of oxyethylene groups, the weight ratio of hydrophile to hydrophobe being from 0.8:1 to 1.2:1.

2. A polyoxyalkylene glycol ether according to claim 1 wherein said aliphatic monohydric alcohol is methanol.

3. A polyoxyalkylene glycol ether according to claim 1 wherein said aliphatic monohydric alcohol is isopropanol.

4. A polyoxyalkylene glycol ether according to claim 1 wherein said aliphatic monohydric alcohol is n-butanol.

5. A polyoxyalkylene glycol ether according to claim 1 wherein said aliphatic monohydric alcohol is isobutanol.

6. A polyoxyalkylene glycol ether according to claim 1 wherein said aliphatic monohydric alcohol is 2-ethylhexanol.

7. A polyoxyalkylene glycol ether consisting of a hydrophobe consisting of the hydrocarbon moiety, of an aliphatic monohydric alcohol containing from 1 to 8 carbon atoms, said hydrocarbon moiety having attached thereto through an etheric oxygen linkage a heteric mixed chain of oxyethylene and 1,2-oxypropylene groups, the weight ratio of oxyethylene groups to 1,2-oxypropylene groups being from 5:95 to 15:85 and the average molecular weight of said hydrophobe being from 1000 to 2000, and attached to said mixed chain a hydrophile consisting of a chain of oxyethylene groups, the weight ratio of hydrophile to hydrophobe being from 0.8:1 to 1.2:1.

8. A polyoxyalkylene glycol ether consisting of a hydrophobe consisting of the hydrocarbon moiety of an aliphatic monohydric alcohol containing from 1 to 8 carbon atoms, said hydrocarbon moiety having attached thereto through an etheric oxygen linkage a heteric mixed chain of oxyethylene and 1,2-oxypropylene groups, the weight ratio of oxyethylene groups to 1,2-oxypropylene groups being from 5:95 to 15:85 and the average molecular weight of said hydrophobe being at least 1200, and attached to said mixed chain a hydrophile consisting of a chain of oxyethylene groups, the weight ratio of hydrophile to hydrophobe being from 0.8:1 to 1.2:1.

9. A polyoxyalkylene glycol ether consisting of a hydrophobe consisting of the hydrocarbon moiety of an aliphatic monohydric alcohol containing from 1 to 8 carbon atoms, said hydrocarbon moiety having attached thereto through an etheric oxygen linkage a heteric mixed chain of oxyethylene and 1,2-oxypropylene groups, the weight ratio of oxyethylene groups to 1,2-oxypropylene groups being from 5:95 to 15:85 and the average molecular weight of said hydrophobe being at least 1500, and attached to said mixed chain a hydrophile consisting of a chain of oxyethylene groups, the weight ratio of hydrophile to hydrophobe being from 0.8:1 to 1.2:1.

10. A polyoxyalkylene glycol ether consisting of a hydrophobe consisting of the hydrocarbon moiety of an aliphatic monohydric alcohol containing from 1 to 8 carbon atoms, said hydrocarbon moiety having attached thereto through an etheric oxygen linkage a heteric mixed chain of oxyethylene and 1,2-oxypropylene groups, the weight ratio of oxyethylene groups to 1,2-oxypropylene groups being about 10:90 and the average molecular weight of said hydrophobe being at least 1000, and attached to said mixed chain a hydrophile consisting of a chain of oxyethylene groups, the weight ratio of hydrophile to hydrophobe being from 0.8:1 to 1.2:1.

11. A polyoxyalkylene glycol ether consisting of a hydrophobe consisting of the hydrocarbon moiety of an aliphatic monohydric alcohol containing from 1 to 8 carbon atoms, said hydrocarbon moiety having attached thereto through an etheric oxygen linkage a heteric mixed chain of oxyethylene and 1,2-oxypropylene groups, the weight ratio of oxyethylene groups to 1,2-oxypropylene groups being from 5:95 to 15:85 and the average molecular weight of said hydrophobe being at least 1000, and attached to said mixed chain a hydrophile consisting of a chain of oxyethylene groups, the weight ratio of hydrophile to hydrophobe being about 1:1.

12. A polyoxyalkylene glycol ether consisting of a hydrophobe consisting of the hydrocarbon moiety of an aliphatic monohydric alcohol containing from 1 to 8 carbon atoms, said hydrocarbon moiety having attached thereto through an etheric oxygen linkage a heteric mixed chain of oxyethylene and 1,2-oxypropylene groups, the weight ratio of oxyethylene groups to 1,2-oxypropylene groups being about 10:90 and the average molecular weight of said hydrophobe being at least 1000, and attached to said mixed chain a hydrophile consisting of a chain of oxyethylene groups, the weight ratio of hydrophile to hydrophobe being about 1:1.

References Cited in the file of this patent

UNITED STATES PATENTS

| | | |
|---|---|---|
| 2,226,119 | De Groote, et al. | Dec. 19, 1940 |
| 2,677,700 | Jackson et al. | May 4, 1954 |

UNITED STATES PATENT OFFICE
CERTIFICATE OF CORRECTION

Patent No. 3,078,315            February 19, 1963

Arthur B. Steele, Jr., et al.

It is hereby certified that error appears in the above numbered patent requiring correction and that the said Letters Patent should read as corrected below.

Column 2, line 14, for "They" read -- The --; column 6, line 71, for "23,897" read -- 23,987 --; column 7, line 36, for "350" read -- 530 --; column 9, line 13, after "cloud" insert -- point --.

Signed and sealed this 1st day of October 1963.

(SEAL)
Attest:

ERNEST W. SWIDER            DAVID L. LADD

Attesting Officer            Commissioner of Patents